US009535762B2

(12) United States Patent
Qiu et al.

(10) Patent No.: US 9,535,762 B2
(45) Date of Patent: Jan. 3, 2017

(54) METHODS TO IMPROVE OVERLOAD PROTECTION FOR A HOME SUBSCRIBER SERVER (HSS)

(75) Inventors: Chaoxin Qiu, Austin, TX (US); Arshad Khan, Austin, TX (US); Niral Sheth, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 716 days.

(21) Appl. No.: 12/789,742

(22) Filed: May 28, 2010

(65) Prior Publication Data

US 2011/0295996 A1 Dec. 1, 2011

(51) Int. Cl.
| | | |
|---|---|---|
| *G06F 15/173* | (2006.01) | |
| *G06F 9/50* | (2006.01) | |
| *H04L 12/801* | (2013.01) | |
| *H04L 12/851* | (2013.01) | |
| *H04L 12/833* | (2013.01) | |

(52) U.S. Cl.
CPC ............ *G06F 9/505* (2013.01); *H04L 47/10* (2013.01); *H04L 47/2441* (2013.01); *H04L 47/2458* (2013.01)

(58) Field of Classification Search
CPC ... H04L 47/10; H04L 47/2458; H04L 47/2441
USPC ........................................................ 709/224
See application file for complete search history.

(56) References Cited

U.S. PATENT DOCUMENTS

| | | | | |
|---|---|---|---|---|
| 6,055,564 | A * | 4/2000 | Phaal ............................ 709/207 |
| 6,333,931 | B1 * | 12/2001 | LaPier et al. ................ 370/385 |
| 6,426,943 | B1 * | 7/2002 | Spinney ............... H04L 12/4625 370/235 |
| 8,078,737 | B2 * | 12/2011 | Cosmadopoulos et al. .. 709/228 |
| 8,908,610 | B2 * | 12/2014 | Zellner ......................... 370/329 |
| 2001/0054111 | A1 | 12/2001 | Lee et al. |
| 2002/0161914 | A1 * | 10/2002 | Belenki ............... H04L 12/5693 709/235 |
| 2004/0242233 | A1 | 12/2004 | Lutgen et al. |
| 2006/0291486 | A1 * | 12/2006 | Cai et al. ...................... 370/401 |
| 2008/0031258 | A1 * | 2/2008 | Acharya et al. ......... 370/395.42 |

(Continued)

OTHER PUBLICATIONS

Rosenberg et al., RFC 3261 SIP: Session Initiation Protocol, pp. 1-60, Jun. 2002, http://tools.ietf.org/html/rfc3261.*

(Continued)

*Primary Examiner* — James Conaway
(74) *Attorney, Agent, or Firm* — Amin, Turocy & Watson, LLP

(57) ABSTRACT

A system and methodology that facilitates improving performance of a Home Subscriber Server (HSS) during overload conditions, by embedding a unique Application Session Identifier (app session ID) within multiple requests associated with a single call processing session is provided. Moreover, the system includes an overload protection component that identifies whether an incoming request is associated with previously processed requests based in part of the app session ID embedded within the incoming request. When the HSS is overloaded, the incoming requests that initiate a new call processing session and are not associated with previously processed requests are rejected/dropped before incoming requests that are associated with requests that have been previously processed.

20 Claims, 14 Drawing Sheets

(56) References Cited

U.S. PATENT DOCUMENTS

| | | | |
|---|---|---|---|
| 2008/0175146 A1* | 7/2008 | Van Leekwuck | H04L 12/5695 370/230 |
| 2008/0225727 A1* | 9/2008 | Yoshida et al. | 370/236 |
| 2008/0228932 A1* | 9/2008 | Monette et al. | 709/229 |
| 2008/0267376 A1* | 10/2008 | Khasnabish | 379/201.01 |
| 2008/0298236 A1* | 12/2008 | Ervin et al. | 370/232 |
| 2009/0144740 A1 | 6/2009 | Gao | |
| 2009/0213837 A1 | 8/2009 | Ku et al. | |
| 2009/0279547 A1 | 11/2009 | Mistry et al. | |
| 2009/0285201 A1 | 11/2009 | Ben-Haim et al. | |
| 2009/0307746 A1 | 12/2009 | Di et al. | |
| 2010/0154057 A1* | 6/2010 | Ko | H04L 63/1416 726/23 |
| 2010/0214924 A1* | 8/2010 | Sendra Alcina et al. | 370/235 |
| 2010/0255826 A1* | 10/2010 | Brewer et al. | 455/414.1 |
| 2011/0040845 A1 | 2/2011 | Cai et al. | |
| 2011/0060771 A1* | 3/2011 | Llorente et al. | 707/812 |
| 2011/0092211 A1* | 4/2011 | Osborn | 455/436 |
| 2011/0149953 A1* | 6/2011 | Helgeson et al. | 370/352 |
| 2011/0225307 A1* | 9/2011 | George et al. | 709/227 |
| 2014/0120939 A1* | 5/2014 | Mang et al. | 455/453 |
| 2015/0043343 A1* | 2/2015 | Filipovic | H04W 4/08 370/230 |
| 2015/0358992 A1* | 12/2015 | Mang | H04M 3/367 370/329 |

OTHER PUBLICATIONS

H. Kaplan, http://tools.ietf.org/html/draft-kaplan-sip-session-id-00, A Session Identifier for the Session Initiation Protocol (SIP) draft-kaplan-sip-session-id-00, 9 pages, last accessed on May 28, 2010.

OA dated Feb. 13, 2012 for U.S. Appl. No. 12/825,936, 21 pages.

OA dated Jul. 9, 2012 for U.S. Appl. No. 12/825,936, 21 pages.

Office Action dated Aug. 15, 2014 for U.S. Appl. No. 12/825,936, 24 pages.

Rosenberg et al., RFC 3261 SIP: Session Initiation Protocol. pp. 1-60, Jun. 2002, http://tools.ietf.org/html/rfc3261.

Office Action dated Jul. 29, 2015 for U.S. Appl. No. 12/825,936, 17 pages.

Office Action dated Mar. 17, 2015 for U.S. Appl. No. 12/825,936, 19 pages.

Office Action dated Jul. 15, 2016 for U.S. Appl. No. 15/064,765, 19 pages.

* cited by examiner

METHODS TO IMPROVE OVERLOAD PROTECTION FOR A HOME SUBSCRIBER SERVER (HSS)

TECHNICAL FIELD

The subject disclosure relates to wireless and/or wired communications and, more particularly, to selection and/or prioritization of requests to a Home Subscriber Server (HSS) for achieving increased service performance in overload conditions.

BACKGROUND

Advances in wireless and/or wired telecommunications are rapidly increasing the utilization of IMS user endpoint devices (UEs) that facilitate communication between users. Typically, a master database, such as a Home Subscriber Server (HSS) in 3GPP architecture, is utilized to store subscription-related information (e.g., subscriber profiles) and registration information associated with the IMS user endpoint devices (UEs). Moreover, the HSS can perform authentication and authorization of the user and can provide information about the subscriber's location and/or IP information. In addition, the HSS provides services to other call processing servers within the communication network, such as Call Session Control Functions (CSCF), application feature servers in 3GPP IP Multimedia Subsystem (IMS) and Long Term Evolution (LTE) networks.

With evolution and growing popularity of wireless and/or wired communication, the HSS can grow to a very large server complex, which can experience various overload conditions. In one example, a faulty server or network connectivity can reduce the available capacity for the HSS. In another example, other portions of the Next Generation Network (NGN) can experience fault recovery resulting in a large number of user equipments (UEs) to flood the NGN core network with initial registration requests. Many conditions including the above examples can cause the HSS to enter an overload condition.

Conventionally, the HSS utilizes an overload protection design that randomly rejects or drops requests from its clients. In particular, when an overload threshold is reached, the conventional system will kick in the associated overload protection policy, which results in rejection or dropping of one or more processing requests. However, when HSS randomly rejects or drops some requests in overload condition, it can drop a second or third Diameter request from a call processor processing a single Session Initiation Protocol (SIP) request, wherein the first or second request has already been processed. To this end, the SIP request fails and the HSS processing for the first and second Diameter request results in a complete waste of the stressed HSS resources. Thus, the traditional approach for overload protection within the HSS, wherein requests are randomly dropped and/or rejected is inefficient and can negatively impact performance and even aggravate the overload condition.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate improving the efficiency of a master database, such as, a Home Subscriber Server (HSS) in an overload situation. In particular, a means to indicate a relationship between multiple Diameter requests is provided to HSS clients (e.g., S-CSCF, I-CSCF, application servers, etc.). Moreover, the HSS can utilize the means to favor requests from the clients that belong to a SIP session whose earlier request(s) have been processed successfully, and thus efficiently utilize HSS processes and/or resources during overload. In one embodiment, the HSS implements an overload protection policy that more likely rejects a first request, in overload condition, which is initiated by a new call processing session than rejecting subsequent requests of a call processing session, wherein earlier requests of the call processing session have already been processed.

In accordance with another aspect, an overload protection component can be employed that facilitates selection of requests, received at the HSS, which can be dropped and/or rejected if the HSS is overloaded. In one example, the overload protection component identifies those requests that are part of a communication session, which has been partially processed by the HSS, e.g., a second (or third) Diameter request wherein the first (or first and second) Diameter request has been previously processed by the HSS. In one aspect, the overload protection component assigns a higher priority for processing to the identified requests as compared to requests that are initiated by a new communication session (e.g., communication session that has not been previously processed by the HSS). Accordingly, the HSS can drop/reject the requests that are initiated by a new communication prior to dropping/rejecting other requests.

Yet another aspect of the disclosed subject matter relates to a method that can be employed to facilitate overload protection at the HSS by employing Application Session Identifiers (app session IDs) embedded within incoming requests. The method comprises receiving a request, for example a Diameter request, from an HSS client, such as, but not limited to, an S-CSCF, I-CSCF, application server, etc. In one aspect, the request can contain a unique app session id, which is indicative of a call processing session, to which the request belongs. If an overload condition is detected, then the app session ID of the request is compared with a stored list of app session IDs. Further, if a match is not found, the request can be dropped/rejected. Else, if a match is found, the request can be processed.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
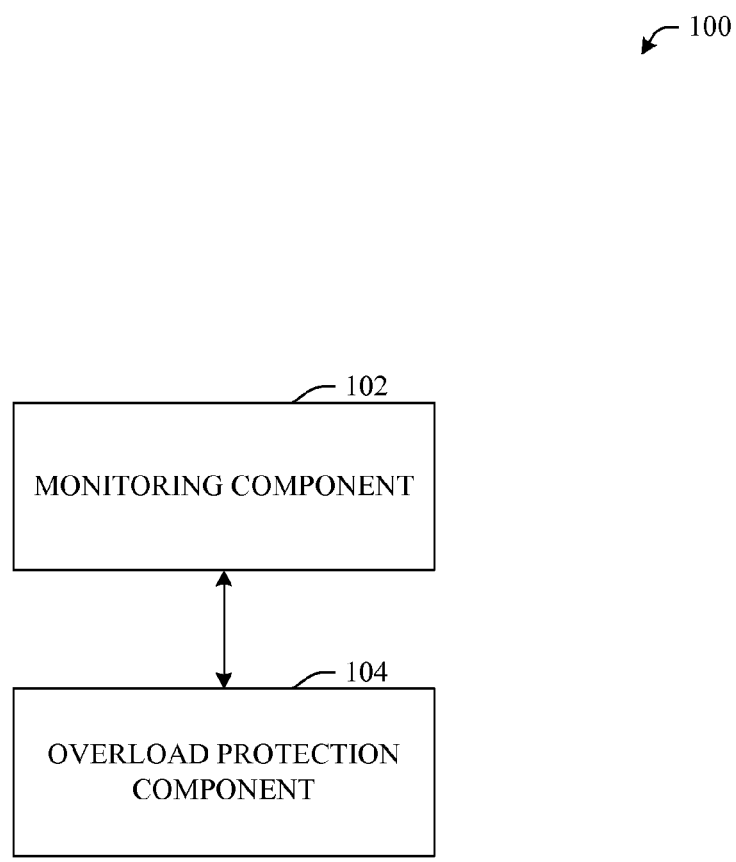
FIG. 1 illustrates an example system that can improve efficiency of a Home Subscriber Sever (HSS) in a wireless/wired communication network, during overload conditions.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "station," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "end device," "mobile device," and similar terminology, refer to a wireless/wired device utilized by a subscriber or user of a wireless/wired communication service to receive or convey data, control, voice, video, sound, gaming, or substantially any data-stream or signaling-stream. The foregoing terms are utilized interchangeably in the subject specification and related drawings. Further, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As network throughput capabilities of third and later generation wireless/wired networks continue to increase, the bandwidth at the Home Subscriber Server (HSS) can often become a capacity bottleneck. Conventional overload protection mechanisms randomly drop/reject requests received at the HSS, which can result in inefficient utilization of resources. The system and method described herein, enables HSS servers to intelligently select which requests should be rejected/dropped in a manner such that optimal service performance is achieved in overload conditions.

Aspects, features, or advantages of the subject innovation can be exploited in substantially any wireless and/or wired communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that can improve efficiency of a subscriber database, such as, but not limited to a HSS in a wireless and/or wired communication network, during overload conditions. Typically, system 100 can include a monitoring component 102 and an overload protection component 104. It can be appreciated that the monitoring component 102 and/or the overload protection component 104 can be implemented within or as part of the HSS and/or externally connected to the HSS.

As defined in the 3GPP (Third Generation Partnership Project) technical specification TS 23.002 v.6.7.0 (2005-03) that is incorporated herein by reference, the HSS is the master database for a given subscriber. The HSS contains the subscription-related information to support the network entities handling calls/sessions. It can be appreciated that although the discussion herein relates to a HSS in a 3GPP architecture, the specification is not so limited and embodiments disclosed herein can be implemented with respect to most any database system within substantially any wireless and/or wired communication technology.

Typically, the HSS can store subscription-related information and location information associated with a subscriber. The HSS can also perform authentication and authorization for a user equipment (UE) and provide information about the subscriber's location and/or Internet protocol (IP) information. The HSS manages subscription-related information in real time, for multi-access and multi-domain offerings in an all-IP environment and performs various functions, such as, but not limited to mobility management, user security, user identification handling, access authorization, service authorization, service profile etc.

In a large IMS or LTE based next generation networks (NGN), the HSS can grow to a very large server complex which can experience various overload conditions. According to an aspect, a monitoring component 102 can be employed to detect these overload conditions for the HSS. For example, the monitoring component 102 can identify one or more faulty servers or network connectivity that reduces the available capacity for the HSS. In another example, portions of the NGN may experience fault recovery resulting in a large number of user endpoint devices (UEs) to flood the NGN core network with initial registration requests. In one embodiment, the monitoring component 102 can compare the incoming requests to the HSS with an overload threshold and determine overload conditions if the number of incoming requests is greater than the overload threshold.

Typically, the communication platform supports geographical redundancy, wherein, if one site goes down or fails, a second site can continue to support the platform and all the subscribers of the first site. This is an important feature for any communication service provider. In this example scenario, the UEs registered with the first site can immediately register with the second site, to maintain network connectivity. Typically, the number of UEs attempting to connect to the second site can be in the millions, which can lead to a large number of registration flows at the second site. In one aspect, the monitoring component 102 can detect such a 'Recovery registration storm', identify that the HSS is overloaded and trigger an overload protection mechanism. In another example scenario, an event, time and/or date, can trigger a short term interest of making phone calls in an area and call volume can pick up exponentially, generating high volume of traffic into the network. Moreover, the monitoring component 102 can identify a bottleneck occurring at the HSS and indicate to an overload protection component 104 that the HSS is overloaded.

According to an embodiment, the overload protection component 104 can be employed to selectively drop or reject requests received at the HSS, during overload conditions. In one example, when the monitoring component 102 detects an overload condition, the overload protection component 104 can identify requests that are part of a communication session that has been partially processed by the HSS. For example, the overload protection component 104 can identify a second (or third) Diameter request wherein the first (or first and second) Diameter request has been previously processed by the HSS. In one aspect, the overload protection component 104 can give a higher priority for processing to the identified requests as compared to a request that is initiated by a new call processing session (e.g., a call processing that has not been previously processed by the HSS). As an example, the request that has been initiated by a new communication session can be dropped and/or rejected.

In particular, when a call processor (e.g., S-CSCF, I-CSCF, application server, etc.) initiates a request to HSS, it can include an application session identifier (app session ID) within the request. Moreover, this app session ID can remain the same for all messages/requests that belong to a single call processing session (e.g., a SIP transaction, or a SIP dialog). When a request is received at the HSS, and the HSS processes the request, the app session ID of the request can be stored in a database. When an overload condition is identified by the monitoring component 102, the overload protection component 104 can extract app session IDs from the incoming requests at the HSS and compare the app session ID of each incoming request with the app session IDs stored in the database. If the app session ID of an incoming request is stored within the database, the overload protection component 104 can assign a higher priority to the incoming request as compared to a request whose app session ID does not exist within the database. In an example, the incoming requests whose app session ID exits in the database can be processed while those whose app session ID does not exist in the database can be rejected or dropped. In one aspect, depending on an overload policy and/or the severity of the overload condition, a portion of these requests (e.g., whose app session ID does not exist in the database) can be rejected/dropped. Further, the monitoring component 102 can also detect when normal (non-overload) condition have been reached (e.g., when the number of incoming request are below the overload threshold) and can instruct the overload protection component 104 to disable overload protection mechanisms.

Figure 2:
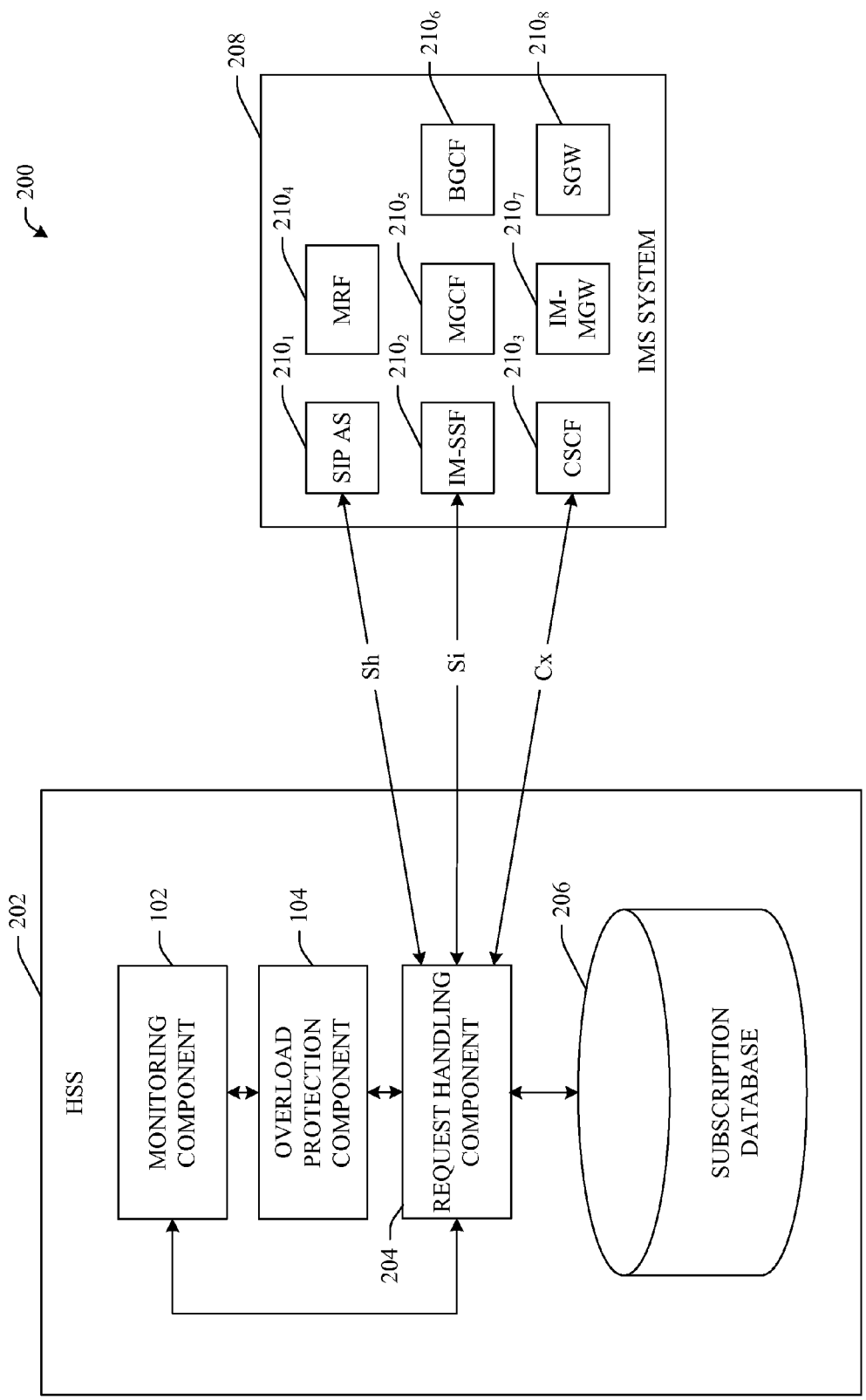
FIG. 2 illustrates an example system that can employ an efficient overload protection mechanism at an HSS in accordance with an aspect of the subject disclosure.

Referring to FIG. 2, there illustrated is an example system 200 that can employ an efficient overload protection mechanism at an HSS 202 in accordance with an aspect of the subject disclosure. It can be appreciated that the monitoring component 102 and the overload protection component 104 can include respective functionality, as more fully described herein, for example, with regard to system 100. Further, it can be appreciated that although the monitoring component 102 and the overload protection component 104 are illustrated to reside within the HSS 202, the monitoring component 102 and/or the overload protection component 104 can be externally connected to the HSS 202. Furthermore, although system 200 depicts a 3GPP architecture, it can be appreciated that the subject specification is not so limited and embodiments disclosed herein can be implemented with respect to most any database system within substantially any wireless and/or wired communication technology.

The conventional function and implementation of the HSS 202, and other 3G aspects associated therewith and in this description can be found in the 3GPP technical specification 3GPP TS 23.002 v6.7.0 (2005-03), the entirety of which is incorporated herein by reference. Typically, the HSS 202 can take the place of an Home Location Register (HLR) in an all-IP network, and contains an Authentication, Authorization and Accounting (AAA) function and other databases, for example subscription database 206. The HSS 202 includes at least a user ID, numbering and address data, user security data, network access and control data for authentication and authorization, user location data at the inter-system level, user registration, and user profile data that can be stored within subscription database 206.

Logical functions of the HSS 202 include at least the following: mobility management for the user through the CS (not shown), PS (not shown) and IMS domains; user security information generation for user authentication, integrity and ciphering data for CS, PS and IMS domains; user security support by supporting authentication procedures for access to the CS, PS and IMS domains; user ID handling by providing the appropriate relations among all identifiers between the CS, PS and IMS domains; access authorization for authorizing a user for mobile access when requested for roaming to a visited network; service authorization checking for establishing a basic call/session and service invocation; and, service provisioning support by providing service profile data for CS, PS, IMS, application services and CAMEL (Customized Applications for Mobile network Enhanced Logic) service support. In one aspect, the HSS 202 can include a request handling component 204 for processing requests received at the HSS 202, for example, from an IMS system 208. In one example, the requests can employ a Diameter protocol. However, it can be appreciated that the subject specification is not limited to the Diameter protocol and most any communication protocol can be utilized.

The major IMS system 208 elements include: a SIP AS (Session Initiation Protocol Application Server) component $210_1$ that represents a platform for SIP application development and operation; an IM-SSF (IP Multimedia-Service Switching Function) component $210_2$ which are the basic call state models used to define the call processing architecture within the IMS 208 and that are recognizable to a CAMEL Service Environment; a Call Session Control Function (CSCF) component $210_3$ that provides control and routing function for IP sessions; an MRF (Media Resource Function) component $210_4$ that mixes various conference participant media streams, and which comprises of a MRFC (Media Resource Function Controller) and a MRFP (Media Resource Function Processor); a Media Gateway Control Function (MGCF) component $210_5$ that provides signaling interoperability between IP and PSTN domains; a Breakout Gateway Control Function (BGCF) component $210_6$ that controls resources allocation to IP sessions; an IM-MGW (Media Gateway) $210_7$ that supports both bearer traffic and signaling traffic between IP and the PSTN (Public Switched Telephone Network); and/or a Signaling Gateway Function (SGW) $210_8$ that performs signaling conversion in both directions at the transport level between SS7 (Signaling System 7) and IP-based transport of signaling. Typically, the above network components 210 of the IMS system 208 can include a Diameter interface with HSS 202 for call processing, per 3GPP IMS standard. Additionally, an S6a interface from a Mobility Management Entity (MME) to HSS 202 by LTE/EPC standard (not shown) can also be employed.

According to an embodiment, an "App Session ID" is created and added to the Diameter interfaces between HSS 202 and its clients within the IMS system 208 (for example, Cx reference point between HSS 202 and S-CSCF/I-CSCF $210_3$, Sh reference point between HSS 202 and application servers $210_1$, and Si reference point between HSS 202 and IM-SSF $210_2$, etc.). Moreover, when a call processor (e.g., S-CSCF, I-CSCF, application servers, etc.) initiates a Diameter request to HSS 202, the call processor can include the app session ID in the Diameter request. In one aspect, the app session ID remains the same for those Diameter messages that belong to a single call processing session (e.g., a SIP transaction, and/or a SIP dialog). Typically, a call processor can send Diameter requests for the same app session ID to the same HSS server 202.

In one aspect, the request handling component 204 can receive and process the Diameter requests, for example, by retrieving data from the subscription database 206. Specifically, when a request is received, during normal (non-overload) operation, and processing is initiated, the request handling component 204 can save the app session ID associated with the request. When the monitoring component 102 identifies an overload condition, the overload protection component 104, can compare an app session ID of any incoming Diameter request with the saved list of app session IDs. Based on the comparison, the overload protection component 104 can instruct the request handling component 204 whether to process or reject/drop the incoming request.

Figure 3:
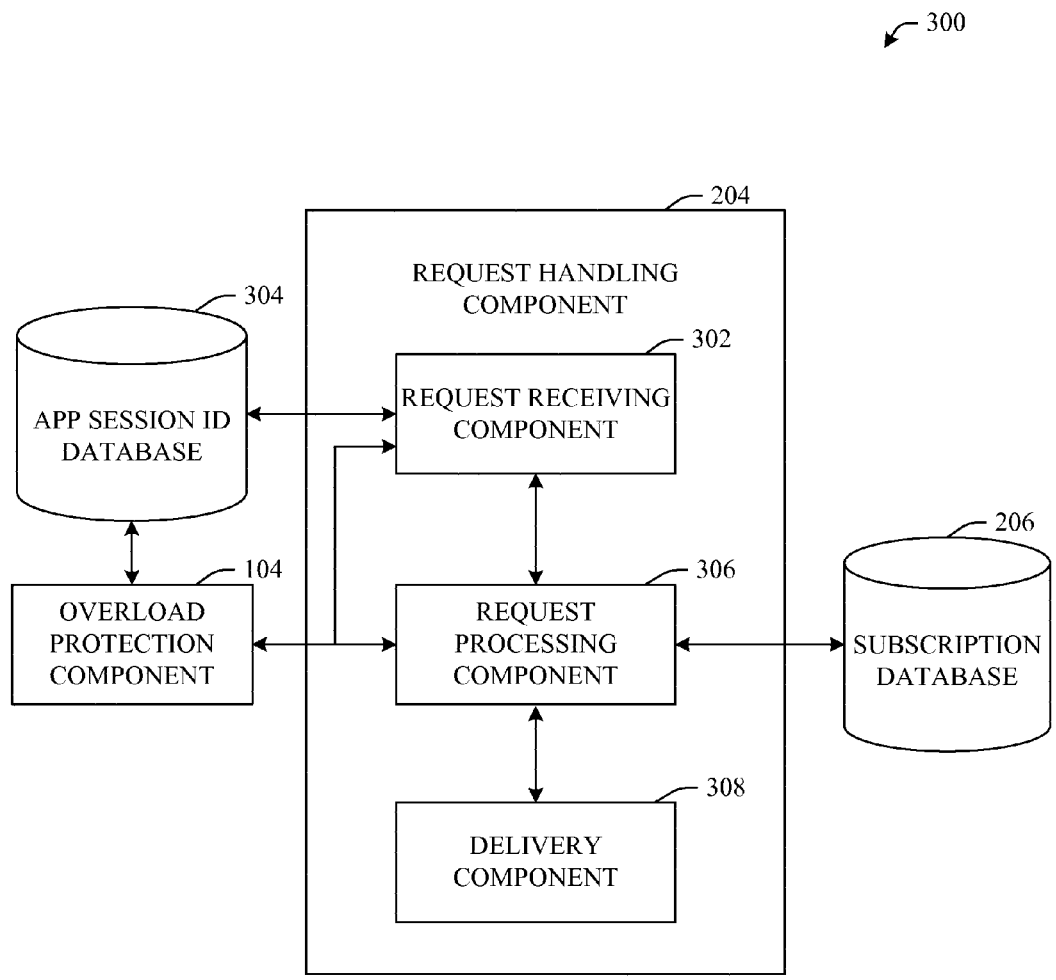
FIG. 3 illustrates an example system that can be employed to facilitate overload protection by employing app session IDs.

Referring now to FIG. 3, there illustrated is an example system 300 that can be employed to facilitate overload protection by employing app session IDs, according to an aspect of the subject disclosure. It can be appreciated that the overload protection component 104, request handling component 204 and the subscription database 206 can include respective functionality, as more fully described herein, for example, with regard to systems 100 and 200.

According to an aspect, the request handling component 204 can include a request receiving component 302 that can be employed to receive a request, for example, a Diameter request, from a network element, such as, but not limited to S-CSCF, I-CSCF, application servers etc. Under normal operating conditions (non-overload condition), the request receiving component 302 can receive a request, identify an app session ID within the request and save the app session ID within the app session ID database 304 for every successfully processed request. In one example, the request receiving component 302 does not record the app session IDs of requests that fail to be processed. Further, during normal operating conditions (non-overload condition), a request processing component 306 can be employed to process the request and retrieve data from the subscription database 206. In another aspect, a delivery component 308 can return the requested data, and/or results of the request to the call processor. In another example, the request receiving component 302 saves the app session ID only during a particular level of overload condition, and does not save app session ID in normal operating condition, for example, to reduce the overhead of the call processing during the normal condition. As an example, the request receiving component 302 can save the app session ID when the HSS enters an overload condition, e.g., yellow level overload.

During overload condition (e.g., identified by the monitoring component 102), a problem can arise from the fact that a call processor (e.g., network element) often needs to issue multiple Diameter requests when processing a request, for example a SIP request. Conventionally, the HSS randomly rejects or drops some Diameter requests, and it can drop a second or third Diameter request from a call processor processing a single SIP request while the first or second request has been processed. In contrast, the HSS 202 disclosed herein can utilize the overload protection component 104 to avoid processing requests that will have no significant benefits due to rejection/dropping of a later request, during an overload situation.

In particular, during an overload condition, the request receiving component 302 can receive a request, for example, a Diameter request can identify the app session ID from the request. Moreover, the overload protection component 104 can implement an overload protection policy that instructs the request processing component 306 to process all subsequent requests for a SIP request, wherein at least one Diameter request has been processed. In addition, the overload protection policy instructs the request processing component 306 to reject or drop a percentage of "first" Diameter request for a SIP request, if need be, (wherein a "first" Diameter request can be most any request initiated by a new call processing session that has not been partially processed by the HSS 202.

For example, during an overload condition, the overload protection component 104 can compare the app session ID from an incoming Diameter request with the app session IDs stored in the app session ID database 304. If a match is found, the overload protection component 104 can instruct the request processing component 306 to process the incoming Diameter request, whereas if a match is not found the overload protection component 104 can instruct the request processing component 306 to assign a low priority for processing the request, and/or reject or drop the request. It can be appreciated that when normal conditions resume, the overload protection component 104 can be deactivated and all requests received by the request receiving component 302 can be processed.

According to an embodiment, the app session ID database 304 can be a hash table or any other data structure that can facilitate fast search. In one example, the app session IDs stored within the app session ID database 304 can be pushed out/deleted/replaced after a specified amount of time, based in part on a policy, etc. Furthermore, it can be appreciated that the app session ID database 304 and/or the subscription database 206 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 4:
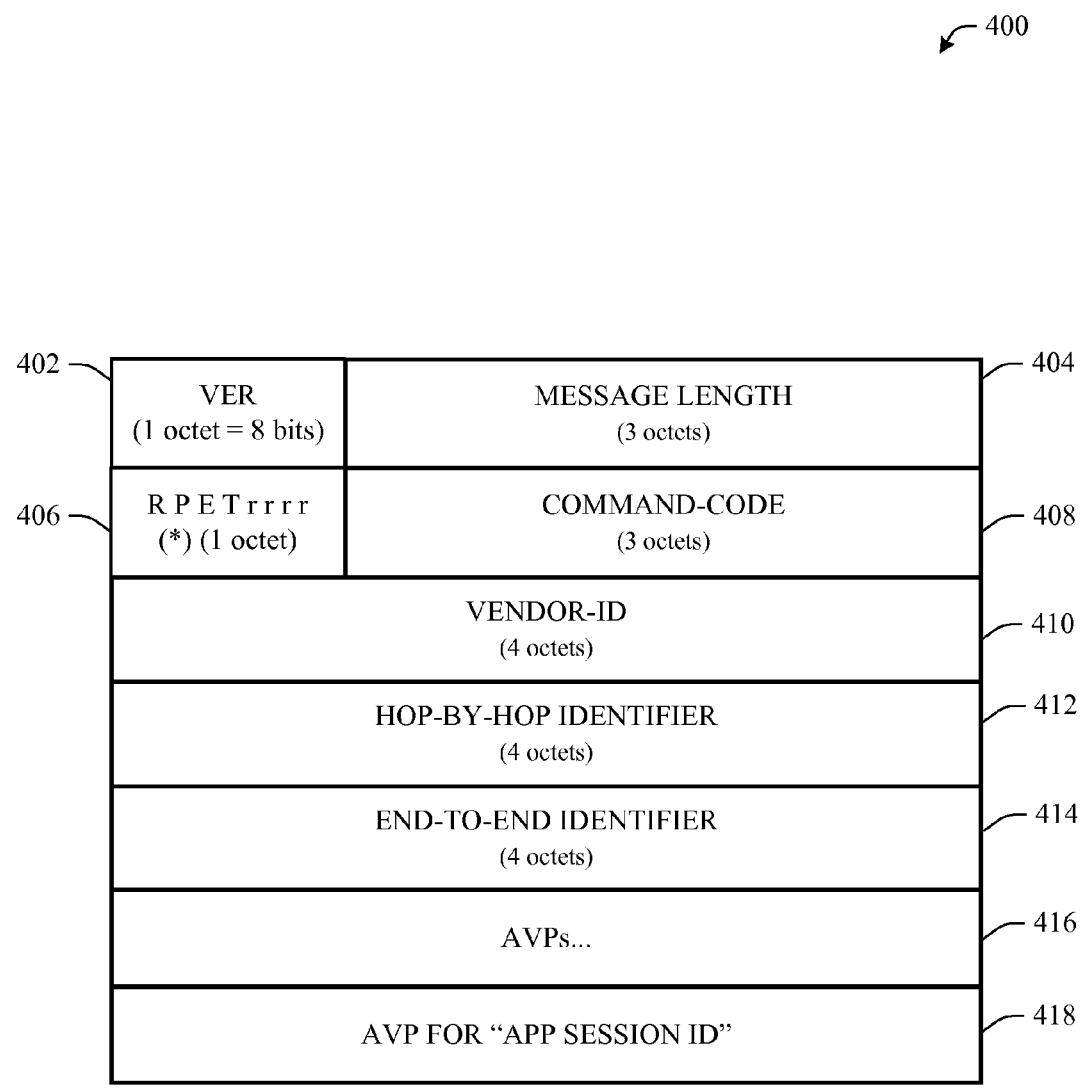
FIG. 4 illustrates an example enhanced Diameter message that facilitates overload protection within the HSS in accordance with the subject innovation.

FIG. 4 illustrates an example enhanced Diameter message 400 that facilitates overload protection within the HSS in accordance with the subject innovation. It can be appreciated that although a message utilizing a Diameter protocol is illustrated, the subject innovation is not limited to utilization of a Diameter protocol and most any communication protocol can be modified to include an app session ID as disclosed herein. Moreover, the systems and methods disclosed herein provide means to HSS clients (e.g., S-CSCF, I-CSCF, application servers, etc.) to indicate a relationship between multiple Diameter requests. Accordingly, the HSS can implement an overload protection policy (e.g., by employing the overload protection component 104) that rejects the first request (if required) and serves subsequent requests if earlier requests have been processed.

The protocol structure 400 can typically include Version field 402 of 1 octet (8 bits). For example, the version can be set to 1 to indicate Diameter Version 1. Further, a Message Length field 404 comprising three octets is employed that can indicate the length of the Diameter message including the header fields. Furthermore, Command Flags 406 are employed, which can be eight bits flags. For example, flags for R-request, P-proxiable, E-error, T-retransmitted, and r-reserve can be utilized. A Command-Code 408—three octets field, can be employed to communicate a command associated with the message.

In addition, a four-octets field 410 can be utilized for specifying a Vendor-ID that typically includes an Internet Assigned Numbers Authority (IRNA) assigned "SMI Network Management Private Enterprise Codes" value, encoded in network byte order. Further, a Hop-by-Hop Identifier 412 and End-to-End Identifier 414 can be employed for matching requests and replies, and detecting duplicate messages respectively. Furthermore, an Attribute Value Pair (AVP) 416 can be employed to encapsulate most any information relevant to the Diameter message 400. In one aspect, an AVP 418 can be created for communicating an app session ID. As an example, the app session ID can include a unique value associated with multiple requests to HSS for an SIP request. Moreover, as noted previously, the app session ID can be utilized by the overload protection component 104 to efficiently prioritize requests during an overload.

Figure 5:
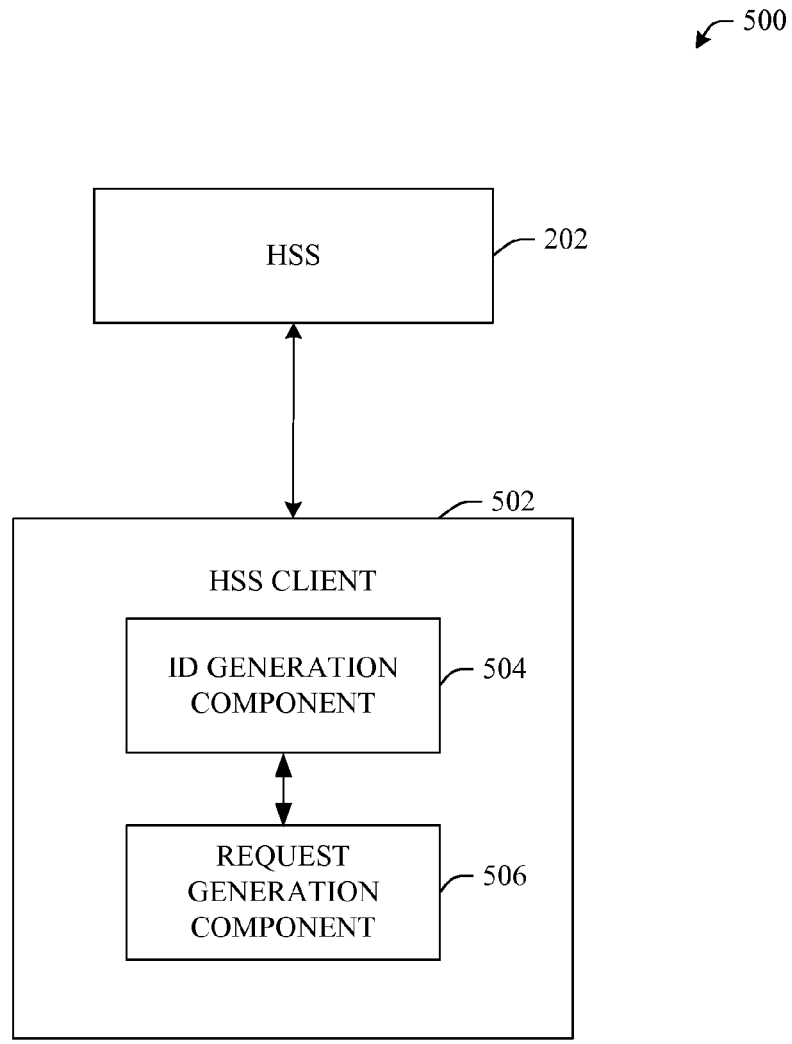
FIG. 5 illustrates an example system for communicating requests to the HSS with embedded app session IDs.

Referring now to FIG. 5, there illustrated is an example system 500 for communicating requests to the HSS 202 with embedded app session IDs, according to an aspect of the subject innovation. Per 3GPP IMS standard, HSS clients 502 can include S-CSCF, I-CSCF, and/or various application servers. However, as noted previously, the subject specification is not so limited and most any client can be employed within most any communication network.

According to an aspect, the HSS client 502 can include an ID generation component 504 that creates a unique app session ID for a set of requests to HSS pertaining to a SIP request (e.g., a SIP transaction, or a SIP dialog). In one example, the ID generation component 504 can employ a random number generator for generating a unique ID. In another example, the app session ID can be a unique client identifier along with a 12-digit sequence number, in order to maintain the uniqueness of the app session ID across the platform with a large number of HSS clients. Typically, the client identifier can be, but is not limited to, a system domain name or URI that has been assigned by a network operator/service provider, during provisioning and/or at a later time.

According to an aspect, the ID generation component 504 provides the same app session ID for those Diameter requests that belong to a single call processing session. Typically, in a scenario with multiple physical instances of a HSS server, a HSS client 502 can send Diameter requests with the same app session ID to the same HSS server instance, for example, HSS 202. It can be appreciated that call processing session can include most any communication, query, request and the like. In one example, the HSS client 502 can determine that two or more Diameter requests belong to a same session if the failure of one request will make the other request useless. There can be several possible ways of defining a criterion for a call processing session, for example, two or more requests can belong to a same call processing session if they are triggered by a single SIP transaction. In another example, two or more requests can belong to a same call processing session if they are part of the processing for a single SIP dialog. In yet another example, two or more requests can belong to a same session if they are part of the processing for SIP requests that contain the same "Session-ID", which is a globally unique session identifier for the same SIP session, which can be maintained across back-to-back user agents (B2BUAs) and other SIP middle-boxes. Accordingly, the HSS client 502 can utilize the ID generation component 504 and/or the request generation component 506 to generate the Diameter request embedded with an appropriate app session ID.

To further improve efficiency, the HSS client 502 can also group multiple Diameter requests together based on most any correlation. For example, the HSS client 502 can assign, via the ID generation component 504, the same app session ID for two or more Diameter requests. Typically, the HSS client 502 has a better view of the end-to-end call processing session and can accordingly group multiple Diameter requests together in a manner to increase efficiency and/or performance. Further, the HSS client 502 can include a request generation component 506 that can initiate a Diameter request to HSS 202. In particular, request generation component 506 can embed the app session ID, generated for the request by the ID generation component 504, within an AVP in the request (e.g., as illustrated in 418 of FIG. 4).

Figure 6:
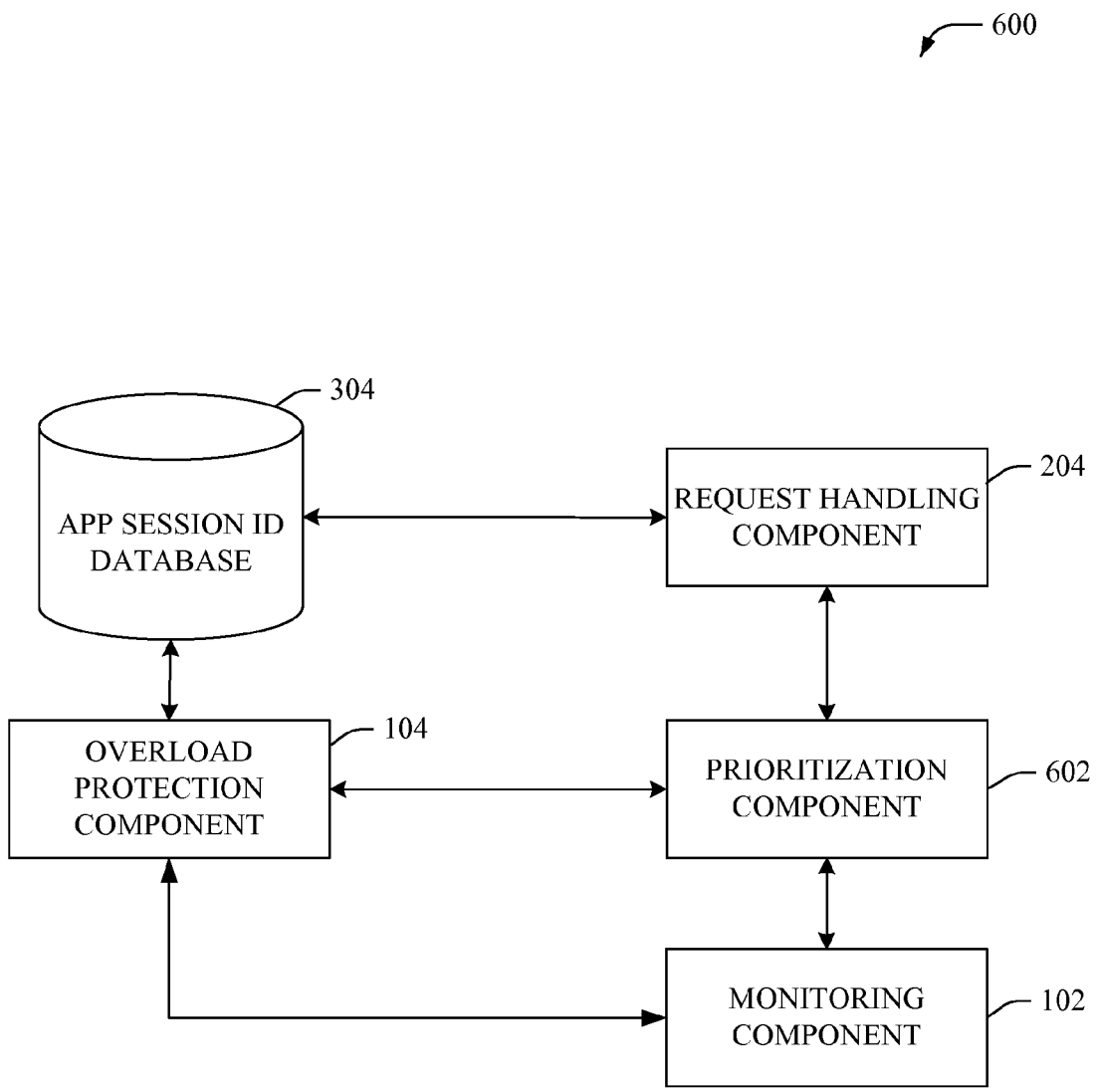
FIG. 6 illustrates an example system that facilitates prioritizing requests received at a master database, during overload conditions.

FIG. 6 illustrates an example system 600 that facilitates prioritizing requests received at a database, such as, but not limited to the HSS, during overload conditions in accordance with an aspect of the subject disclosure. It can be appreciated that the monitoring component 102, the overload protection component 104, the request handling component 204 and the app session ID database 304 can include respective functionality, as more fully described herein, for example, with regard to systems 100, 200 and 300. Typically, the HSS server can be a large system with multiple server instances in multiple functional layers. In one aspect, the enhancements disclosed herein can be implemented in the overload protection component 104, which can be included in the "front-end" servers that interface with HSS clients directly.

As discussed above, the overload protection component 104 can be enabled when an overload condition is detected and can select incoming requests to be rejected/dropped based in part on an app session ID. In addition, a prioritization component 602 can be employed that combines the selection by the overload protection component 104 with various other overload protection algorithms. For example, the monitoring component 102 can monitor the system workload based on resource (e.g., CPU %, memory %, buffer and queue sizes, etc.) usage and/or performance (e.g., response time, etc.) and the prioritization component 602 can assign a priority to an incoming request based on an analysis of the monitored information. Additionally or alternatively, the prioritization component 602 can implement various priority based policies to select requests to be rejected or dropped. Typically, some flexibility can be provided for network operators to tune the policy. For example, the prioritization component 602 can assign a priority based on a type of request, an interface or a client from which the request is received.

In one aspect, the prioritization component 602 can rank the requests selected by the overload protection component 104 as requests that can be processed by the request handling component 204 (e.g., those requests for which an app session ID match is found in the app session ID database). As an example, a rank can be determined based in part on the amount of processing previously performed for the call session associated with the incoming request. Moreover, the greater the amount of processing performed previously, the higher the priority/rank assigned to the request for being processed. In another example, the request with the least amount of processing performed can be dropped or rejected if severe overload conditions exist. Accordingly, the prioritization component 602 can rank the requests selected by the overload protection component 104 in an order, such that the lower ranked requests can be rejected/dropped before the higher ranked requests. It can be appreciated that the prioritization component 602, the monitoring component 102, the overload protection component 104, the request handling component 204 and the app session ID database 304 can reside completely and/or partially within the HSS and/or can be externally connected to the HSS.

FIGS. 7-8 and 10-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
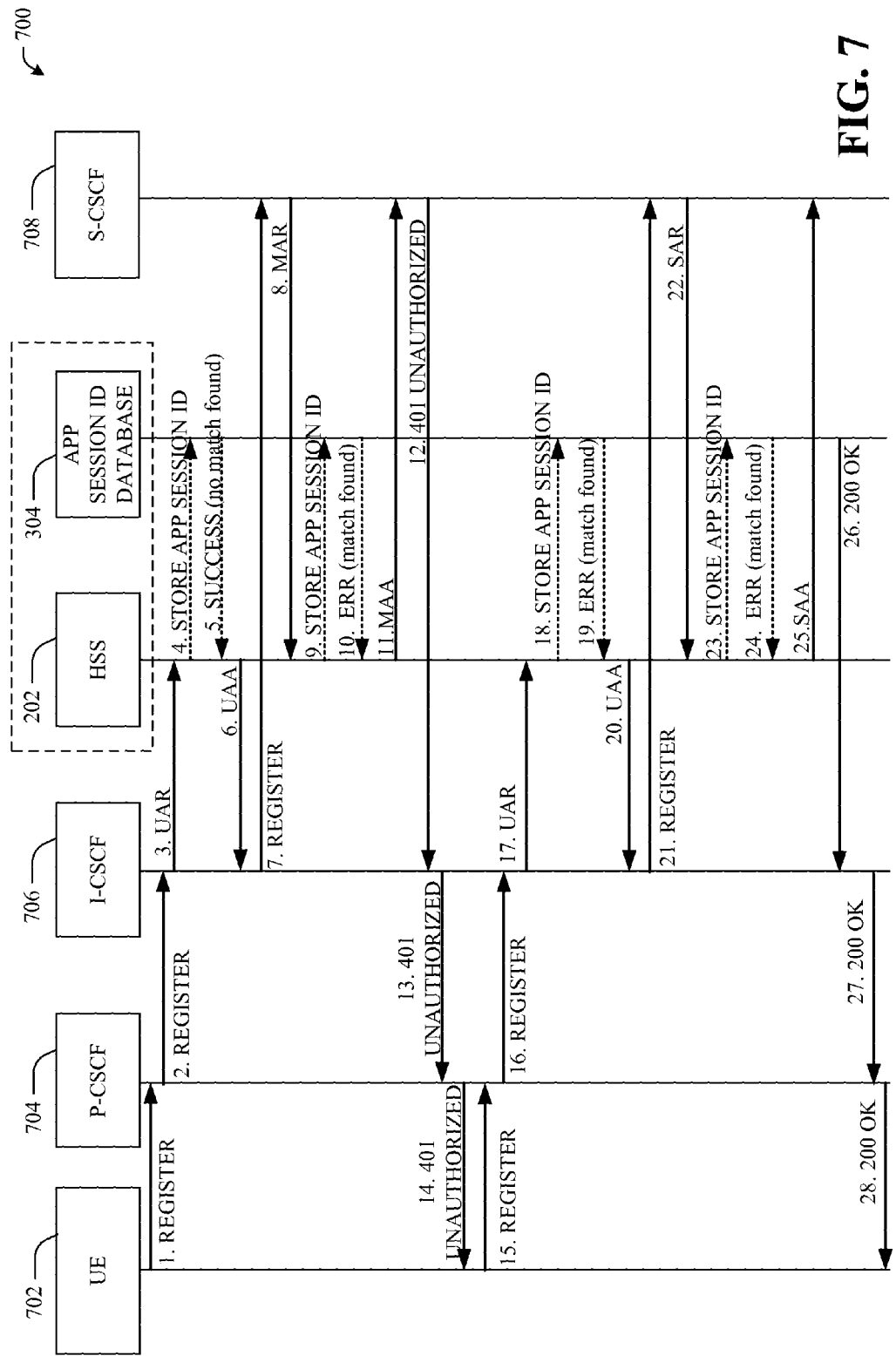
FIG. 7 illustrates an example an example flow diagram that depicts a sequence for user equipment (UE) registration in accordance with an aspect of the subject specification.

Referring now to FIG. 7, which illustrates an example flow diagram 700 that depicts a sequence for UE registration in accordance with an aspect of the subject specification. It can be appreciated that the HSS 202 and the app session ID database 304 can include functionality, as more fully described herein, for example, with regard to systems 200 and 300, and that the app session ID database 304 can be internal or externally connected to the HSS 202. As an example, in the case wherein the app session ID database 304 is internal to the HSS 202, the communication between app session ID database 304 and the HSS 20 (e.g., steps 4, 5, 9, 10, 18, 19, 23, and 24) can be an interprocess function call (e.g., depicted in FIG. 7 by dotted lines). Further, it can be appreciated that UE registration is one example of requests received by the HSS 202 and the subject specification is not limited to UE registration requests. As noted supra, one or more embodiments of the subject specification implement overload protection mechanism at the HSS 202 while receiving most any requests from most any HSS client. Moreover, the flow diagram 700 illustrates an example scenario that depicts request handling during an overload situation, if a portion of the session associated with the request has been previously processed by the HSS 202.

At step 1, the UE 702 can send a REGISTER request, for example SIP REGISTER, to the P-CSCF 704. At step 2, the REGISTER request is forwarded to the I-CSCF 706. Further, at step 3, the I-CSCF 706 sends a Diameter User-Authorization request (UAR) to the HSS 202. According to an aspect, the UAR can contain a unique app session ID, e.g., generated by the I-CSCF. Typically, the HSS 202 filters the Public User ID contained in the SIP REGISTER request, for example, the HSS 202 can verify that the Public User ID is allocated to a legitimate user and determine whether an S-CSCF is allocated for the user. In addition, the HSS 202 can also verify the home network of the UE and if different, determine whether the home network has a roaming agreement with the network of the P-CSCF 704.

At step 4, the HSS 202 can store the app session ID from the UAR within the app session ID database 304, for example, at any stage after receiving the UAR (in step 3). In response, at step 5, a match not found is returned by the app session ID database 304. If the HSS 202 is overloaded, a low priority can be assigned to the UAR (not shown), however, in this example scenario, the HSS is not yet overloaded and thus, at step 6, the HSS 202 returns a User-Authorization Answer (UAA) to the I-CSCF 706. In an example, the UAA indicates a list of capabilities that the I-CSCF 706 can employ to select an appropriate SIP server (e.g., S-CSCF 708) and/or a SIP or SIPS URI pointing S-CSCF 708.

Further, at step 7, the I-CSCF 706 forwards the SIP REGISTER request to the S-CSCF 708. Then, the S-CSCF 708 can request user authentication from the HSS 202 by sending a Diameter Multimedia-Auth-Request (MAR) message, as shown at step 8. In one aspect, the MAR can contain the same unique app session ID associated with the session. At step 9, the HSS 202 can store the app session ID from the MAR, received at step 8, within the app session ID database 304. Since the app session ID has been previously stored (at step 4), a match is found at step 10. In the case wherein the HSS 202 is overloaded, a high priority for processing can be assigned to the MAR. Thus, in this example scenario, when the HSS 202 is overloaded, the HSS 202 processes the MAR and thus, at step 11, the HSS 202 responds with a Diameter Multimedia-Auth-Answer (MAA) message that includes a Result-Code AVP set to the value DIAMETER_MULTI_ROUND_AUTH. The HSS 202 can also generate a nonce and include a challenge in the MAA message.

Further, at step 12, the S-CSCF 708 can employ the challenge to map into the WWW-Authenticate header in the SIP 401 (Unauthorized) response, which is sent back to the I-CSCF 706. At step 13, the I-CSCF 706 forwards 401 (Unauthorized) response to the P-CSCF 704, which in turn forwards the 401 (Unauthorized) response to the UE 702 (as shown at step 14). At step 15, the UE sends a next SIP REGISTER request containing the user credentials to the P-CSCF 704, which forwards the request to the I-CSCF 706, as shown at step 16. At step 17, the I-CSCF 706 contacts the HSS 202 by sending a Diameter UAR message to determine the S-CSCF 708 allocated to the UE 702. In one aspect, the UAR can contain the same unique app session ID associated with the call processing session.

At step 18, the HSS 202 stores the app session ID from the UAR received at step 17 in the app session ID database 304. Since the app session ID has been previously stored (at step 9), a match is found at step 19. At this stage, it can be determined that the HSS 202 is overloaded (e.g., by the monitoring component 102), and hence the HSS 202 prioritizes the request and proceeds to process the request. At step 20, the HSS 202 returns a UAA to the I-CSCF 706, and at step 21, the I-CSCF 706 forwards the SIP REGISTER request to the S-CSCF 708. Further, the S-CSCF 708 extracts the credentials from the SIP REGISTER request and sends a server assignment request (SAR) message to the HSS 202, which can include the app session ID. Once again, at step 23 the HSS 202 stores the app session ID from the SAR received at step 22 in the app session ID database 304. Since the app session ID has been previously stored (at step 18), a match is found at step 24. Since it is determined that the HSS 202 is overloaded (e.g., by the monitoring component 102), the HSS 202 assigns a high priority to the SAR and proceeds to process the request. At step 25, the HSS 202 sends a server assignment answer (SAA), which can include user profile information, to the S-CSCF 708. The S-CSCF 708, in response to the SAA, generates a SIP 200 (OK) response which is sent to the I-CSCF 706 (at step 26) and eventually to the UE 702 via steps 27 and 28.

Figure 8:
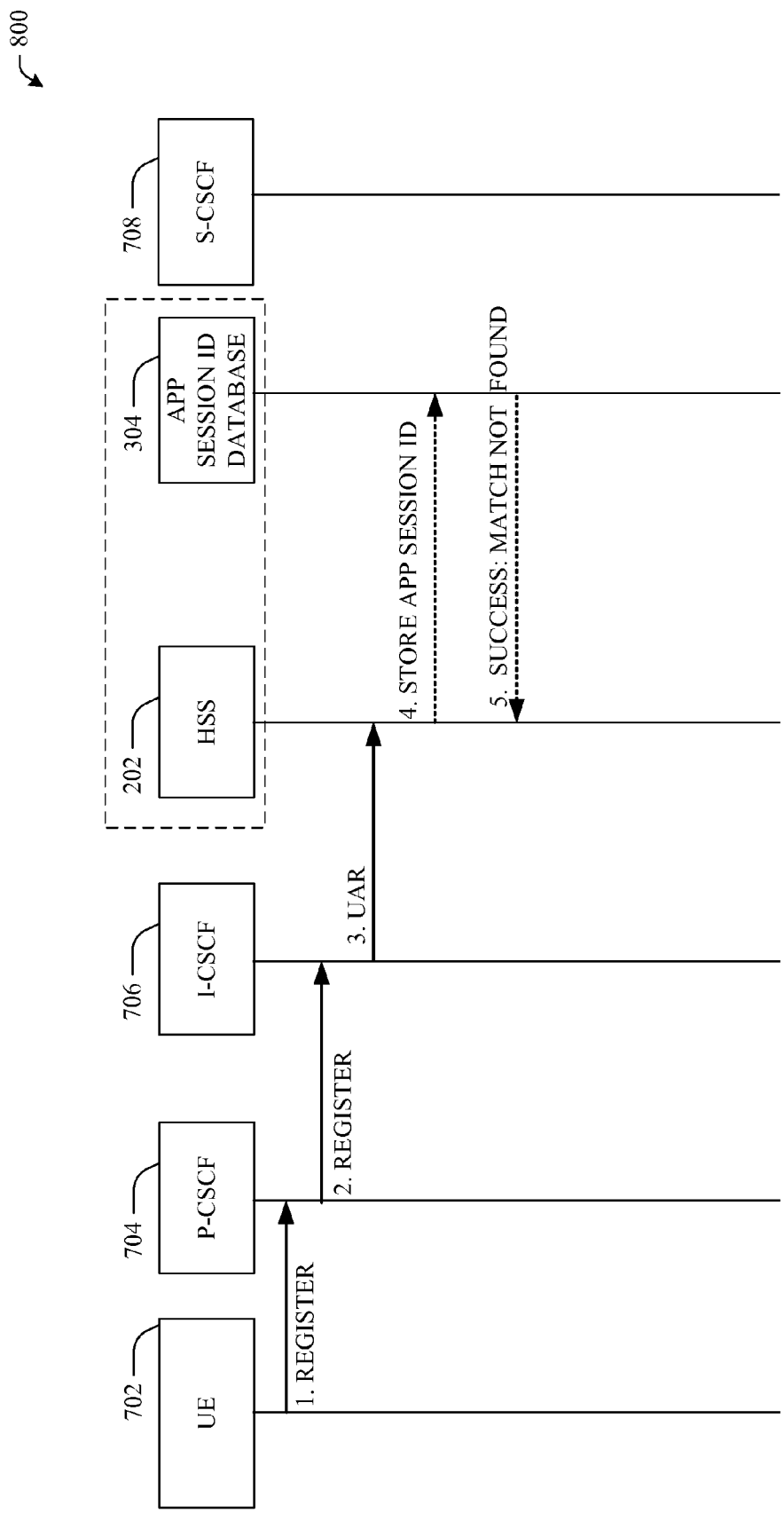
FIG. 8 illustrates an example flow diagram that depicts a sequence for UE registration, wherein an initial request for registration is received when the HSS is overloaded.

FIG. 8 illustrates an example flow diagram 800 that depicts a sequence for UE registration during overload conditions in accordance with an aspect of the subject specification. It can be appreciated that the HSS 202, the app session ID database 304, UE 702, P-CSCF 704, I-CSCF 706, and S-CSCF 708 can include functionality, as more fully described herein, for example, with regard to systems 200, 300 and 700. As noted previously, the app session ID database 304 can be internal and/or externally connected to the HSS 202. In one example, wherein the app session ID database 304 is part of the HSS 202, the communication between app session ID database 304 and the HSS 20 (e.g., steps 4 and 5) can be an interprocess function call (e.g., depicted in FIG. 8 by dotted lines). Further, it can be appreciated that UE registration is one example of requests received by the HSS 202 and the subject specification is not limited to UE registration requests. Moreover, the flow diagram 800 illustrates an example scenario that depicts request handling by the HSS 202 if a request initiated by a call processing session is receiving, when the HSS 202 is overloaded.

At step 1, the UE 702 can send a REGISTER request, for example SIP REGISTER, to the P-CSCF 704. It can be appreciated that the UE 702 can include most any LTE-based communication device, such as, but not limited to, a cell phone, a digital media player, a gaming console, a digital camera, a video recorder, a personal digital assistant (PDA), a personal computer, laptop, etc. As an example, the UE 702 can be mobile (e.g. cell phone), have limited mobility (e.g. a desktop computer) and/or be stationary (e.g. LTE-based home device/appliance). At step 2, the REGISTER request is forwarded to the I-CSCF 706. Further, at step 3, the I-CSCF 706 sends a Diameter UAR, which includes a unique app session ID, to the HSS 202. If the HSS 202 is not overloaded, it can continue to process the request (not shown). However, in this example scenario, it is determined (e.g., by the monitoring component 102) that the HSS 202 is overloaded. According to an aspect, at step 4, the HSS 202 stores the app session ID from the UAR to the app session ID database 304. Since this request is the first request sent by the UE 702 and is not associated with previous processing by the HSS 202, the app session ID is not previously stored within the app session ID database 304. Thus, at step 5, a match is not found message is returned to the HSS 202. The HSS 202 can assign a low priority for processing the request and based on an overload policy can drop/reject the request. In one example, if the HSS 202 decides to drop the request silently, the I-CSCF 702 will eventually timeout the UAR request and respond to P-CSCF 704 with a SIP error such as 480 or 500 error. Alternately, if the HSS 202 decides to reject the request, the HSS can respond to I-CSCF 702 with an MAA comprising a Diameter error code. The I-CSCF 702 in turn can respond with a SIP error code, such as 500 or 503.

Figure 9:
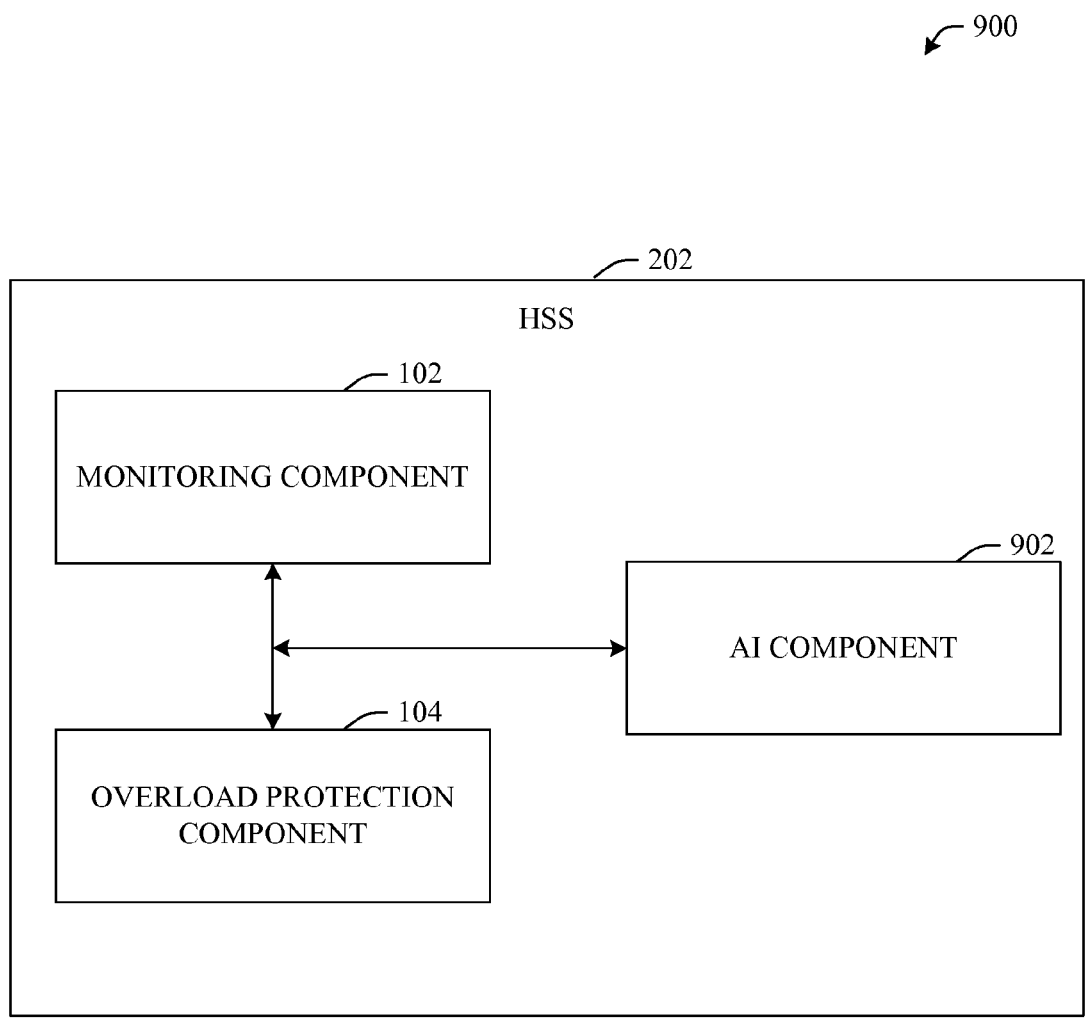
FIG. 9 illustrates an example system that facilitates automating one or more features in accordance with the subject innovation.

FIG. 9 illustrates a system 900 that employs an artificial intelligence (AI) component 902, which facilitates automating one or more features in accordance with the subject innovation. It can be appreciated that the monitoring component 102, overload protection component 104 and HSS 202 can include respective functionality, as more fully described herein, for example, with regard to systems 100, 200, 300, 600, 700 and 800. Further, the AI component 902 can reside within the HSS 202, as shown, and/or can be locally or remotely connected to the HSS 202. The subject innovation (e.g., in connection with overload protection) can employ various AI-based schemes for carrying out various aspects thereof. For example, a process for determining, during overload conditions, a request that can be processed, and/or a request that can be dropped and/or rejected can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of wireless/wired communication systems, for example, attributes can be derived from content of the requests and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing operator behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when the HSS 202 can be considered as overloaded, how to handle incoming requests at the HSS 202 during overload conditions, which requests to reject/drop and/or which requests to process, during overload conditions, how long to store the app session IDs within the app session ID database 304, etc. The criteria can include, but is not limited to, resource demands, historical patterns, UE behavior, user preferences, service provider preferences and/or policies, type of request, type of HSS client that sends the request, etc.

Figure 10:
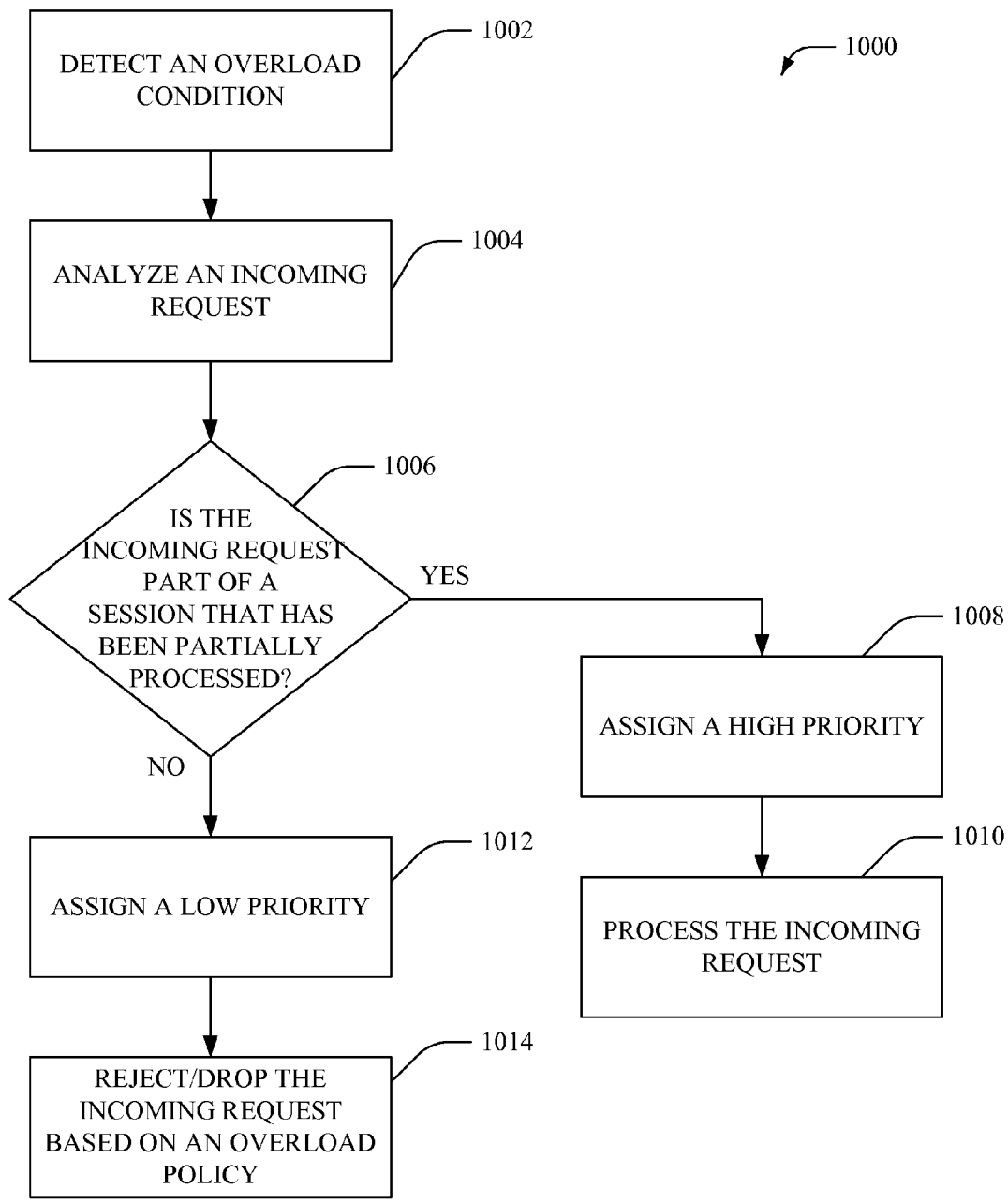
FIG. 10 illustrates an example methodology that can be utilized to facilitate efficient request handling at the HSS to reduce overload.

Referring now to FIG. 10, illustrated is an example methodology 1000 that can be utilized to facilitate efficient request handling at the HSS to reduce overload in accordance with an aspect of the subject innovation. Although the methodologies disclosed herein are discussed with respect to a HSS in a 3GPP architecture, it can be appreciated that the subject specification is not so limited and embodiments disclosed herein can be implemented with respect to most any database system within substantially any wireless/wired communication technology.

At 1002, an overload condition can be detected. Moreover, one or more faulty servers or network connectivity that reduces the available capacity for the HSS can be identified. In one example, a recovery registration storm can be identified and/or a bottleneck at the HSS can be detected. In another example, the number of incoming requests at the HSS can be compared with an overload threshold to determine overload conditions. On detecting the overload condition, at 1004, an incoming request can be analyzed. For example, an app session ID can be extracted from the request and compared with a list of app session IDs stored in a database. At 1006, it can be determined whether the incoming request is part of a call processing session, which has been partially processed. In one example, if a match is found in the database for the app session ID, it can be determined that the incoming request is part of a call processing session that has been previously processed by the HSS. Accordingly, if the incoming message is determined to be part of a call processing session, at 1008, a high priority can be assigned to the request. At 1010, the incoming request can be processed based on its high priority for processing. However, if the incoming message is determined not to be part of a partially processed call processing session then at 1012, a low priority for processing can be assigned to the request. At 1014, a set of the incoming request can be rejected and/or dropped to reduce overload, for example, based on an overload policy. In another aspect, the incoming request can be processed only after all requests with a higher priority have been processed.

Figure 11:
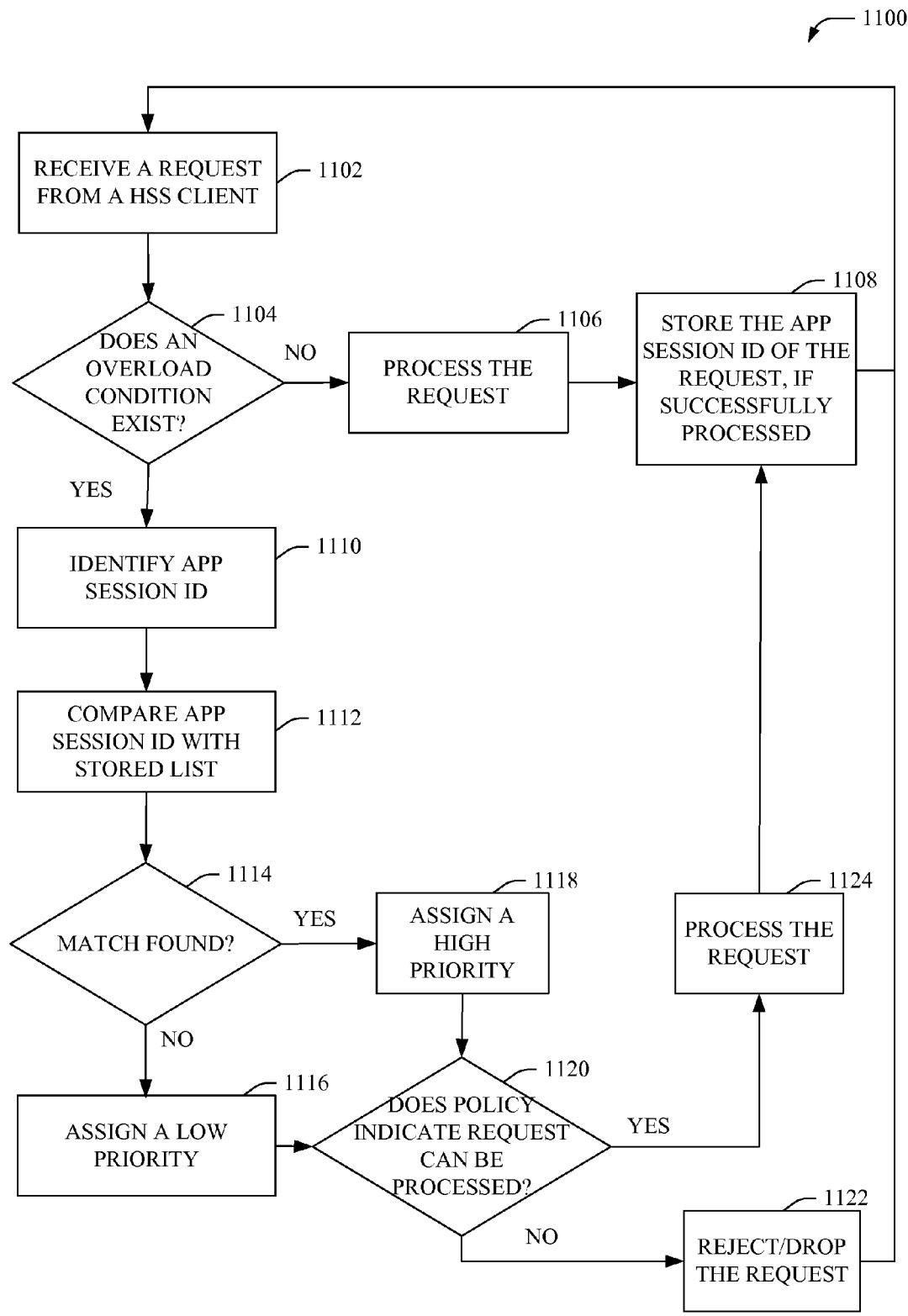
FIG. 11 illustrates an example methodology that provides overload protection at the HSS by employing app session IDs.

FIG. 11 illustrates an example methodology 1100 that provides overload protection at the HSS by employing app session IDs, in accordance with an aspect of the subject specification. At 1102, a request can be received, at the HSS, from an HSS client. For example, a Diameter request can be received from an S-CSCF, I-CSCF, application server, etc. At 1104, it can be determined whether an overload condition exists at the HSS. If determined that the HSS is not overloaded, then at 1106, the request can be processed. Further, at 1108, an app session ID can be extracted from the request and at 1108, the app session ID can be stored, for example in a database, if the request is successfully processed. In one example, if the request fails (not shown), the app session id is not stored and the methodology can return to 1102. However, if an overload condition is detected (at 1104), then at 1110, an app session ID of the request is identified. Typically, the app session ID is embedded within the request by the HSS client and includes a unique number that identifies a SIP session that the request is part of.

At 1112, the app session ID can be compared with a stored list of app session IDs. Further, at 1114, it can be determined whether a match is found for the app session ID of the request in the list. If a match is not found, at 1116, the request can be a low priority can be assigned to the request. Alternately, if a match is found, at 1118, a high priority can be assigned to the request. Further, at 1120, a policy can be applied (e.g., by a scheduler) to determine whether the request can be processed or not. Moreover, the number of request that can be processed can be determined based on the policy and/or overload condition. Typically, the high priority requests can be given a higher priority for processing and can processed prior to a low priority request. Further, if it is determined (e.g., by the policy) that some of the requests are to be dropped/rejected, it is more likely lower priority requests that can be dropped. In one example, a certain percentage of lower-priority requests are dropped/rejected first. However, in an extreme case, if all lower priority requests are dropped and the HSS is still overloaded, then a portion of the high priority requests can also be rejected/ dropped. If it is determined, for example, by applying the policy that the request should be rejected, then at 1122 the request can be rejected/dropped. Alternately, it is determined, for example, by applying the policy that the request can be processed, at 1124, the request can be processed. In one example, the app session ID of the successfully processed request can be stored back into the list, as shown at 1108

Figure 12:
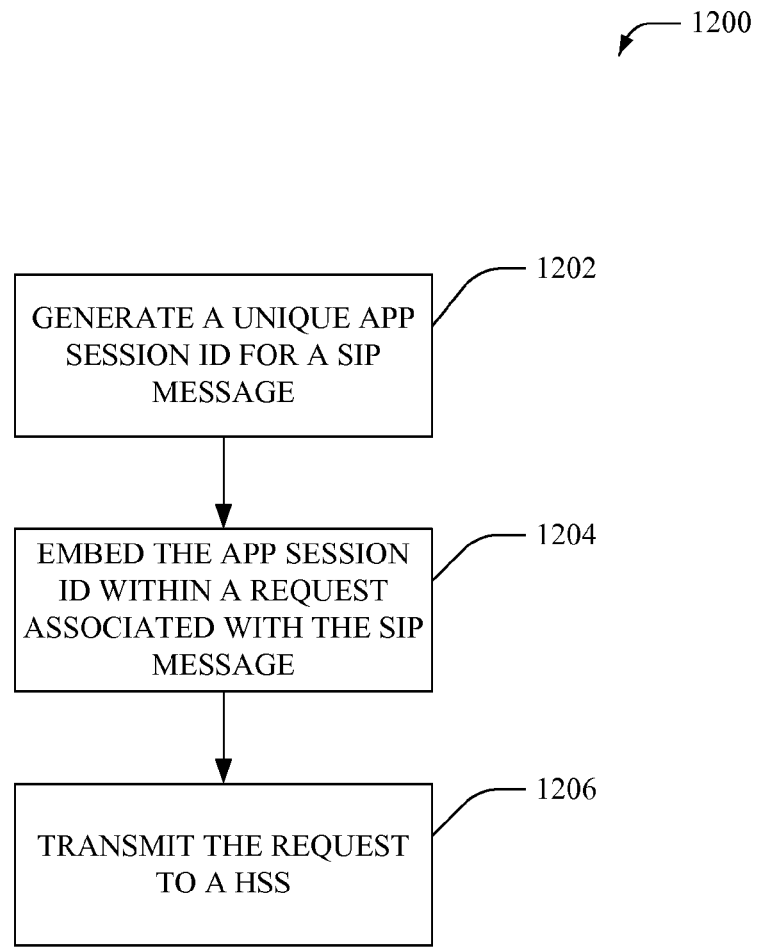
FIG. 12 illustrates an example methodology that can be employed for transmission of requests to an HSS that facilitate overload protection at the HSS.

Referring to FIG. 12, there illustrated an example methodology 1200 that can be employed for transmission of requests to an HSS that facilitate overload protection at the HSS, according to an aspect of the subject disclosure. At 1202, a unique app session ID can be created for a call processing session, for example, a SIP transaction, or a SIP dialog. In one aspect, a random number generator can be employed for generating the unique ID. In another aspect, the app session ID can be a unique client identifier along with a 12-digit sequence number, in order to maintain the uniqueness of the app session ID across the platform with a large number of HSS clients. For example, the client identifier can be, but is not limited to, a system domain name or URI that has been assigned by the network operator/service provider, during provisioning and/or at a later time.

At 1204, the unique app session id can be embedded within a request associated with the call processing session. Most often, multiple Diameter requests are issued, for example, by a HSS client, when processing a single call session. Accordingly, the same app session id can be assigned to the multiple Diameter requests issued for the single SIP message. As an example, the unique app session id can be embedded within an AVP of the Diameter request. At 1206, the request can be transmitted to a master database, for example, a HSS. In one aspect, an interface, such as, but not limited to Sh, Si, and/or Cx can be utilized during transmission.

Figure 13:
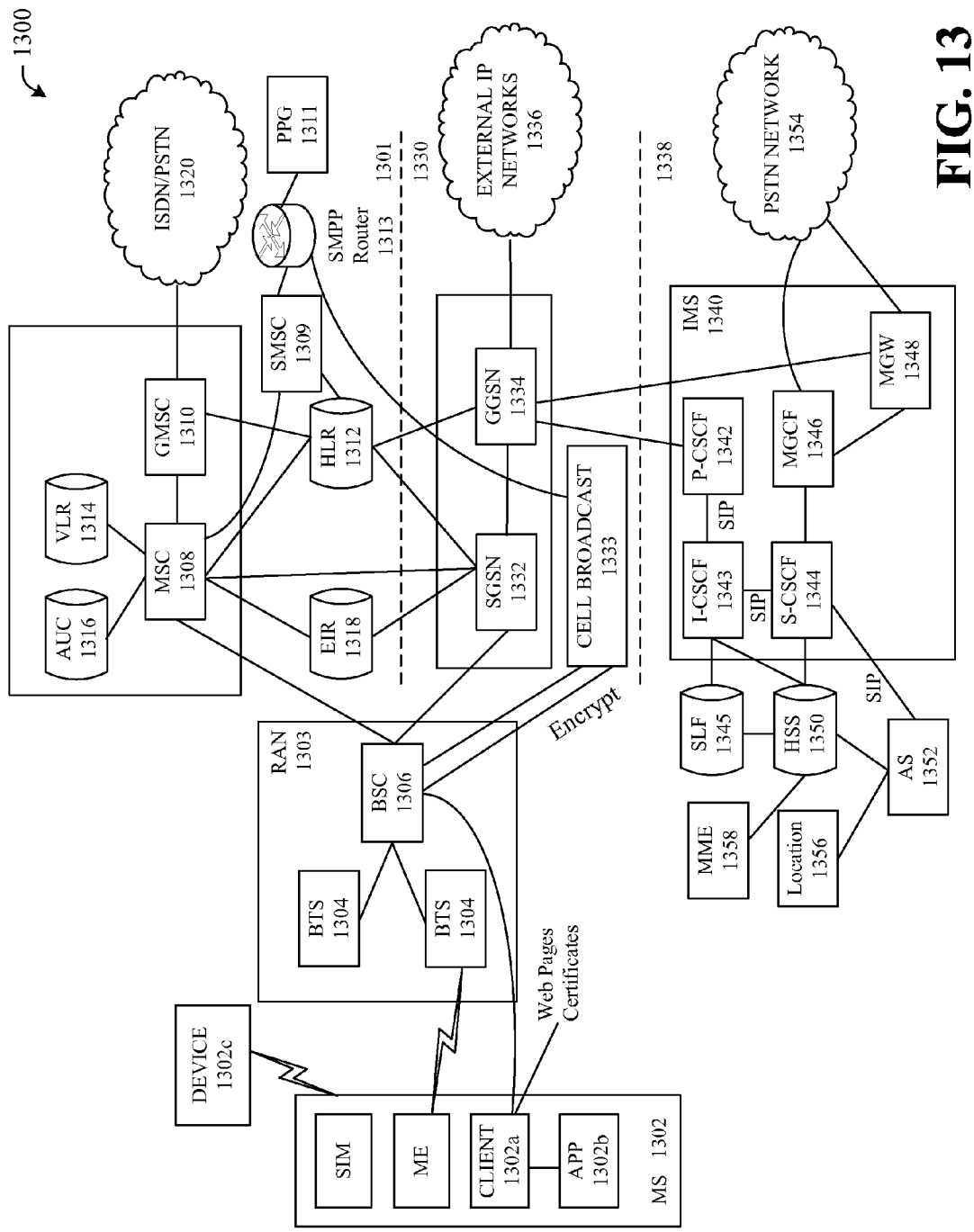
FIG. 13 illustrates a GSM/GPRS/IP multimedia network architecture that can employ the disclosed architecture.

Now turning to FIG. 13, such figure depicts an example GSM/GPRS/IP multimedia network architecture 1300 that can employ the disclosed communication architecture. In particular, the GSM/GPRS/IP multimedia network architecture 1300 includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1302 includes an embedded client 1302a that receives and processes messages received by the MS 1302. The embedded client 1302a can be implemented in JAVA and is discuss more fully below.

The embedded client 1302a communicates with an application 1302b that provides services and/or information to an end user. Additionally or alternately, the MS 1302 and a device 1302c can be enabled to communicate via a short-range wireless communication link, such as BLUETOOTH®. As one of ordinary skill in the art would recognize, there can be an endless number of devices 1302c that use the SIM within the MS 1302 to provide services, information, data, audio, video, etc. to end users.

The BTS 1304 is physical equipment, such as a radio tower, that enables a radio interface to communicate with the MS 1302. Each BTS can serve more than one MS. The BSC 1306 manages radio resources, including the BTS. The BSC 1306 can be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1318. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. In other words, the GMSC 1310 provides interworking functionality with external networks.

The HLR 1312 is a database or component(s) that comprises administrative information regarding each subscriber registered in a corresponding GSM network. The HLR 1312 also includes the current location of each MS. The VLR 1314 is a database or component(s) that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (e.g., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations, security functions, and access controls.

A Cell Broadcast Center (CBC) 1333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN. In a GSM/GPRS network, GPRS services and GSM services can be used in parallel. A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 can be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 can also modify an outgoing request according to a set of rules defined by the network operator (for example, address analysis and potential modification).

The I-CSCF 1343 forms an entrance to a home network and hides the inner topology of the home network from other networks and provides flexibility for selecting an S-CSCF. The I-CSCF 1343 can contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302. The MME 1358 provides authentication of a user by interacting with the HSS 1350 in LTE networks.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber. It can be appreciated that the HSS 1350 is substantially similar to HSS 202 described herein and includes functionality described in detail herein with respect to HSS 202.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with a PSTN network 1354 for TDM trunks. In addition, the MGCF 1346 communicates with the PSTN network 1354 for SS7 links.

Figure 14:
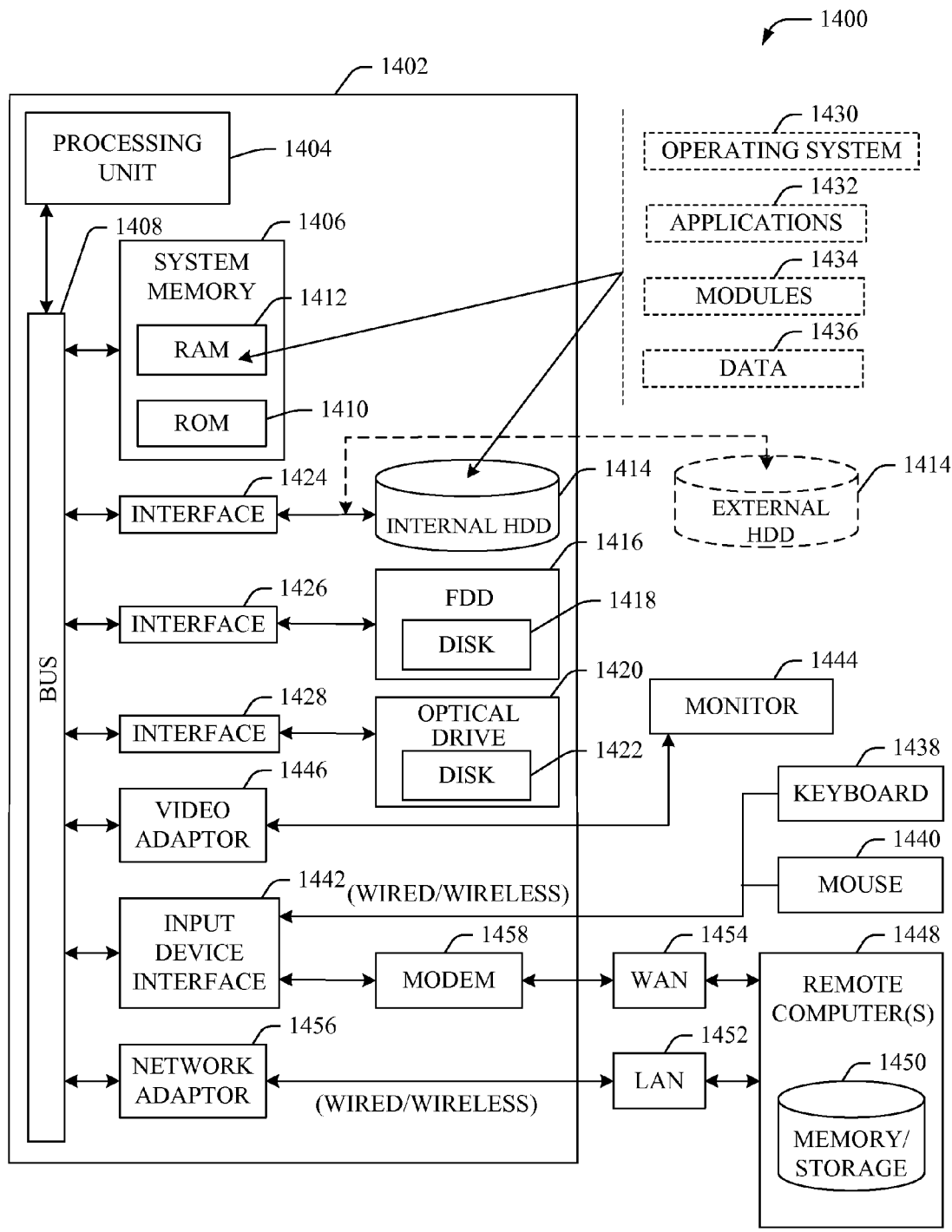
FIG. 14 illustrates a block diagram of a computer operable to execute the disclosed communication architecture.

Referring now to FIG. 14, there is illustrated a block diagram of a computer operable to execute the disclosed communication architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless/wired devices or entities operatively disposed in wireless/wired communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
forwarding requests associated with call processing sessions to a server of a network that stores subscriber data associated with subscribers of the network for processing by the server, comprising not storing respective identifier data of the requests associated with the call processing sessions that have been processed by the server;
in response to detection of a first overload condition associated with the server, storing the respective identifier data of the requests associated with the call processing sessions that have been processed by the server after the detection of the first overload condition;
receiving a request associated with a call processing session, wherein the request is to be directed to the server,
in response to detection of a second overload condition associated with the server, determining whether identifier data of the respective identifier data has been previously stored for a previous request associated with the call processing session that has been processed by the server, and
in response to determining that the identifier data has been previously stored for the previous request associated with the call processing session that has been processed by the server, forwarding the request to be processed by the server comprising assigning a priority to the request based on an amount of previous requests associated with the call processing session that have been processed by the server, wherein a first request associated with a first call processing session comprising a first amount of processing of previous requests associated with the first call processing session processed by the server is assigned a higher priority than a second request associated with a second call processing session comprising a second amount of processing of previous requests associated with the second call processing session processed by the server, and wherein the second amount is lower than the first amount.

2. The system of claim 1, wherein the request includes an attribute value pair that specifies the identifier data.

3. The system of claim 1, wherein the operations further comprise, in response to determining that the identifier data has not been previously stored for previous requests, comprising the previous request, associated with the call processing session that have been processed by the server, preventing the forwarding of the request to be processed by the server.

4. The system of claim 1, wherein the receiving comprises receiving the request by utilizing a diameter protocol.

5. The system of claim 3, wherein the preventing the forwarding of the request to be processed by the server comprises rejecting the request.

6. The system of claim 1, wherein the priority assigned to the request is further based upon a type of the request.

7. The system of claim 1, wherein the priority assigned to the request is further based upon a type of client from which the request was received.

8. A method, comprising:
forwarding, by a system comprising a processor, requests associated with call processing sessions to a server of a network that stores subscriber data associated with subscriber identities subscribed to the network for processing by the server, comprising not storing respective identifier data contained within the requests associated with the call processing sessions that have been processed by the server;
in response to detection of a first overload condition associated with the server, storing, by the system, the respective identifier data contained the requests associated with the call processing sessions that have been processed by the server after the detection of the first overload condition;
receiving, by the system, a request associated with a call processing session, wherein the request is directed to the server;
in response to detection of a second overload condition associated with the server, determining, by the system, whether identifier data of the respective identifier data has been previously stored for a previous request associated with the call processing session that has been previously processed by the server; and
in response to determining that the identifier data has been previously stored for the previous request associated with the call processing session that has been processed by the server, forwarding, by the system, the request for processing by the server comprising assigning a priority to the request based on an amount of previous requests associated with the call processing session that have been processed by the server, wherein a first request associated with a first call processing session comprising a first amount of processing of previous requests associated with the first call processing session processed by the server is assigned a higher priority than a second request associated with a second call processing session comprising a second amount of processing of previous requests associated with the second call processing session processed by the server, and wherein the second amount is lower than the first amount.

9. The method of claim 8, further comprising:
in response to determining that the identifier data has not been previously stored for the previous request associated with the call processing session that has been processed by the server, performing, by the system, no action with respect to the forwarding the request for processing by the server.

10. The method of claim 8, wherein the receiving includes receiving the request via the network by employing a diameter protocol.

11. The method of claim 8, wherein the priority assigned to the request is further based upon a type of the request.

12. The method of claim 8, wherein the priority assigned to the request is further based upon a type of client from which the request was originated.

13. The method of claim 8, wherein the request includes an attribute value pair that specifies the identifier data.

14. The method of claim 8, wherein the receiving comprises receiving the request by utilizing a diameter protocol.

15. A non-transitory machine-readable storage medium, comprising executable instructions that, when executed by a processor, facilitate performance of operations, comprising:
processing communication messages associated with call processing sessions, wherein the processing the communication messages comprises not recording respective identifier data contained within the communication messages associated with the call processing sessions that have been processed by the server;
in response to detecting a first overload condition associated with the server, recording the respective identifier data contained within the communication messages associated with the call processing sessions that have been processed by the server after the detecting of the first overload condition;
receiving a communication message associated with a call processing session;
in response to detecting a second overload condition associated with the server, determining whether identifier data of the respective identifier data has been previously recorded for a previous communication message associated with the call processing session that has been processed by the server; and
in response to determining that the identifier data has been previously recorded for the previous communication message associated with the call processing session that has been processed by the server, forwarding the communication message to be processed by the server comprising assigning a priority to the communication message based on an amount of previous communication messages associated with the call processing session that have been processed by the server, wherein a first communication message associated with a first call processing session comprising a first amount of processing of previous communication messages associated with the first call processing session processed by the server is assigned a higher priority than a second communication message associated with a second call processing session comprising a second amount of processing of previous communication messages associated with the second call processing session processed by the server, and wherein the second amount is lower than the first amount.

16. The non-transitory machine-readable storage medium of claim 15, wherein the operations further comprise, in response to determining that the identifier data has not been previously recorded for the previous communication message associated with the call processing session that has been processed by the server, not performing the forwarding of the communication message to be processed by the server.

17. The non-transitory machine-readable storage medium of claim 16, wherein the not performing the forwarding of the communication message to be processed by the server comprises rejecting the communication message.

18. The non-transitory machine-readable storage medium of claim 15, wherein the receiving comprises receiving the communication message by utilizing a diameter protocol.

19. The non-transitory machine-readable storage medium of claim 15, wherein the priority assigned to the communication message is further based on a type of the communication message.

20. The non-transitory machine-readable storage medium of claim 15, wherein the priority assigned to the communication message is further based on a type of client from which the communication message was received.

* * * * *